United States Patent [19]

Jochmann

[11] 4,041,805
[45] Aug. 16, 1977

[54] CHANGE GEAR TRANSMISSION IN GROUP ARRANGEMENT FOR MOTOR VEHICLES, ESPECIALLY FOR USE IN AGRICULTURE AND IN THE CONSTRUCTION FIELD

[75] Inventor: Dieter Jochmann, Hurth-Gleuel, Germany

[73] Assignee: Klockner-Humboldt-Deutz-Aktiengesellschaft, Cologne, Germany

[21] Appl. No.: 554,433

[22] Filed: Mar. 3, 1975

[30] Foreign Application Priority Data

Mar. 2, 1974 Germany .......................... 2410164

[51] Int. Cl.² .................. F16H 37/00; F16D 3/44; F16D 13/22
[52] U.S. Cl. ........................ 74/740; 192/25; 192/67 R
[58] Field of Search ............ 192/84 AB, 29, 85 AA, 192/25, 24, 67 R; 74/745, 740

[56] References Cited

U.S. PATENT DOCUMENTS

| 439,213 | 10/1890 | Veeder | 192/84 AB |
| 1,360,394 | 11/1920 | Gordon | 192/85 AA |
| 1,848,194 | 3/1932 | Page | 192/29 X |
| 3,744,345 | 7/1973 | Keienburg et al. | 74/745 |
| 3,783,985 | 1/1974 | May | 74/745 X |
| 3,838,759 | 10/1974 | Schmoelz et al. | 192/67 R X |
| 3,916,711 | 11/1975 | Hoyer | 74/745 X |

*Primary Examiner*—Samuel Scott
*Assistant Examiner*—Lance W. Chandler
*Attorney, Agent, or Firm*—Walter Becker

[57] ABSTRACT

A geared tranmsission in group arrangement, especially for motor driven agricultural and construction vehicles in which an input shaft is adapted via a selectively operable friction clutch to be connected to a source of driving power, such as an engine. An output shaft adapted for connection to a load is coaxially arranged with the input shaft. A countershaft parallel to the output shaft is geared directly to the input shaft while gear trains extending between the countershaft and output shaft are under the control of friction clutches on the countershaft. The gear of the gear train on the countershaft are rotatable thereon and the gear of the gear train on the output shaft are nonrotatable thereon. The gear of the gear drive from the input shaft to the countershaft which is on the countershaft includes bolts for the mechanical coupling thereof to the adjacent gear of the gear train which is rotatable on the countershaft.

4 Claims, 1 Drawing Figure

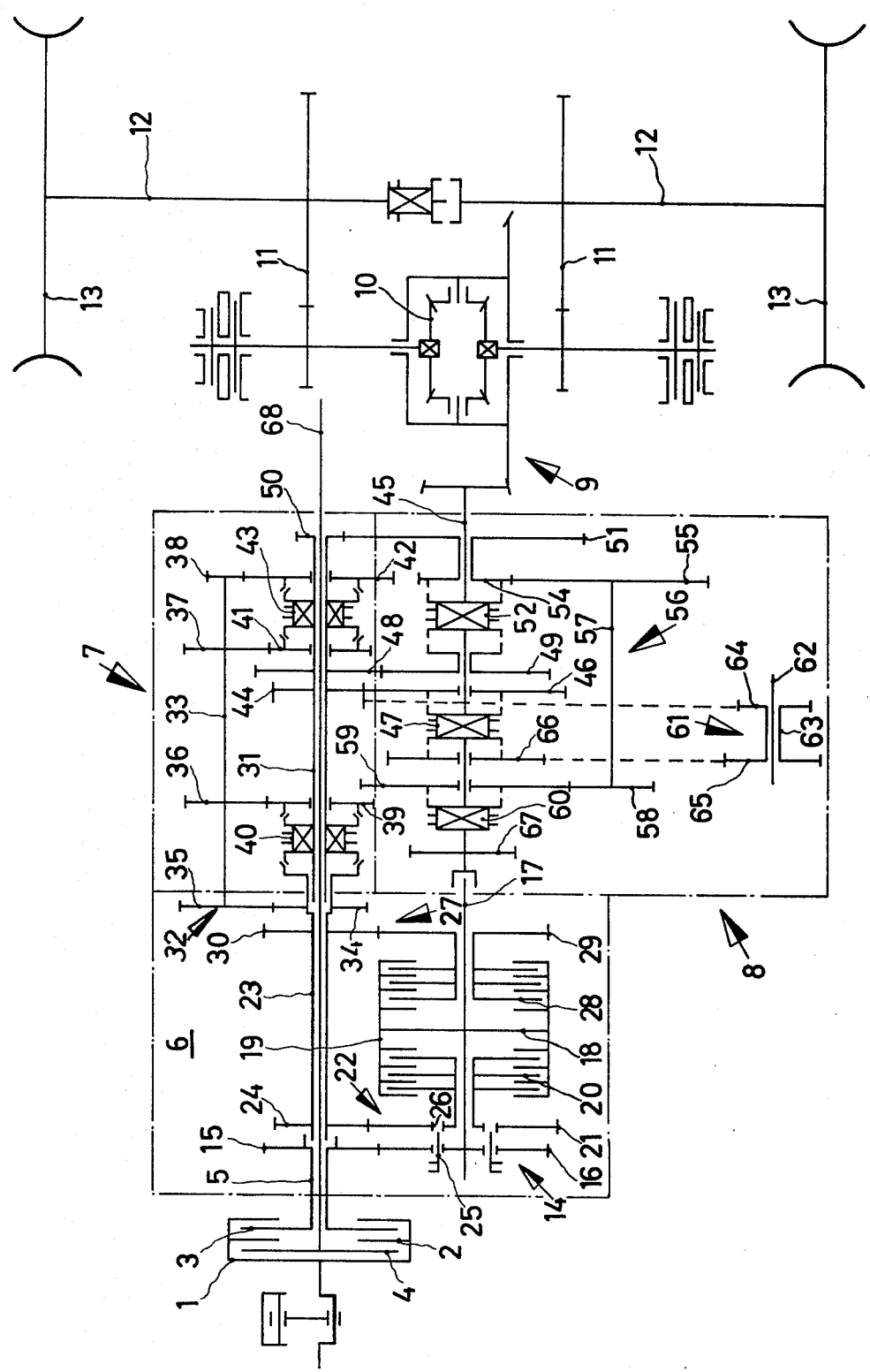

CHANGE GEAR TRANSMISSION IN GROUP ARRANGEMENT FOR MOTOR VEHICLES, ESPECIALLY FOR USE IN AGRICULTURE AND IN THE CONSTRUCTION FIELD

The present invention concerns a change gear transmission in group arrangement, especially for motor vehicles for use in agriculture and in the construction field, which comprises a group transmission that precedes a main control group, and in which the input shaft of said change gear transmission is adapted to be driven by a driving engine through the intervention of an engageable and disengageable driving clutch, and in which said change gear transmission includes two control stages each of which is adapted to be engaged and disengaged by a friction clutch.

With change gear transmissions of the above mentioned type, for reasons of an economical manufacture of the group transmission there exists the problem to be able to use an identical group transmission with a plurality of identical structural elements over as great a power range as possible in connection with the maximum number of vehicles and with driving engines which differ from each other in their motor power and output speed. Furthermore, with a motor vehicles having a change gear transmission of the above mentioned type, in case of failure of the two friction control clutches due to wear of its friction discs or in case of failure of the servo-elements used in connection with the engagement of the clutches there exists the problem to be able, in an emergency, to drive the motor vehicle without auxiliary means through at least one branch of the group transmission.

Starting on the basis of these findings, it is an object of the present invention so to improve a change gear transmission of the above mentioned general type by simple means that an adaptation of the group transmission to driving engines of different output speed will be possible and that in case of failure of the friction control clutches it will be possible without any auxiliary means to drive at least selectively one branch of the group transmission. These and other objects and advantages of the invention will appear more clearly in the following specification in connection with the accompanying drawing diagrammatically illustrating a change gear transmission according to the present invention.

The change gear transmission according to the invention which is built in group arrangement is characterized primarily in that the two friction control clutches are arranged on a countershaft which is adapted to be driven through the input shaft and an input transmission, and is furthermore characterized in that the output shaft of the group transmission is adapted to be driven by secondary members of the two control clutches selectively through the intervention of one transmission each. The transmission according to the invention is furthermore characterized in that the transmission which is adjacent to the input transmission is adapted selectively to be driven by the input transmission while bypassing the power flow of the two friction control clutches.

This arrangement will bring about that through the input transmission it will be possible to adapt the group transmission to driving engines of different output speed while simultaneously there will exist a possibility of driving in an emergency a group transmission branch if the friction clutches should fail.

According to a further development of the invention, a particularly favorable solution for the group transmission with regard to costs and the control technique is obtained when that gear of the input transmission which is mounted on the countershaft and is adapted to be driven by the input shaft is adapted to be coupled with the adjacent gear of one of the transmissions associated with the two control clutches. In this connection, it is expedient that the clutch means for selective direct connection of the input transmission with the adjacent transmission are designed as control bolts which are axially guided in a gear and through a control ring are coupled to each other.

According to a further development of the invention, it is provided that the output shaft of the clutch transmission is coaxially arranged with regard to the input shaft for said group transmission. Such a solution is preferable in particular with a parallel drive in the power flow of an auxiliary drive which is derived coaxially from the driving engine and is dependent on the driving engine speed. Furthermore, in order to lower the location of the overall center of gravity of the transmission, it is suggested that the two friction control clutches are arranged below the output shaft of the group transmission.

Referring now to the drawing in detail, the flywheel 1 of a not illustrated driving engine designed as internal combustion engine has associated therewith a double friction clutch 2 which comprises follower discs 3 and 4 adapted individually to be engaged and disengaged. The follower disc 3 is non-rotatably connected to an input shaft 5 of the group transmission 6 pertaining to the change gear transmission according to the invention. The change gear transmission according to the invention, in addition to comprising the group transmission 6 also comprises a main control group 7 following said group transmission 6, and a post control group 8 driven by the main control group 7. A bevel gear transmission 9 which is adapted to be driven by the control group 8 is followed by a differential 10 by means of which through a transmission 11 each there is a driven a driving axle shaft 12 each with an associated driving wheel 13.

The group transmission 6 comprises an input transmission 14 with a gear 15 non-rotatably connected to the input shaft 5, and furthermore comprises a gear 16 meshing with the gear 15. Gear 16 is non-rotatably mounted on a countershaft 17 which is journalled parallel to the input shaft 5 in the non-illustrated housing of the group transmission 6. The countershaft 17 is likewise non-rotatably connected to the primary part 18 of a double friction coupling or clutch 19 adapted to be engaged by a pressure fluid medium. The double friction clutch 19 is provided as a disc clutch. The double friction clutch 19 representing the control clutches of the group transmission 6 has a left hand secondary part 20 (with regard to the drawing) which is non-rotatably connected to an adjacent gear 21 of a transmission 22 serving to form a first control stage S of the group transmission 6 for street operation. The transmission 22 furthermore comprises a gear 24 which meshes with the gear 21 and is non-rotatably mounted on an output shaft 23 that is coaxial to the input shaft 5. The gear 21 is adapted to be coupled to the gear 16 through the intervention of control bolts 25 which are carried by gear 16. These bolts 25 may be moved axially to couple gear 16 to gear 21. In case of failure of the non-illustrated servo-members of the pressure fluid operated double friction clutch 19 or other lack of operation of the clutch; the bolts 25 may be moved into corresponding clutch bores 26 of the gear 21 by means of a non-illustrated control ring (see U.S. Pat. No. 3,783,985—May issued Jan. 8, 1974 belonging to the assignee of the present invention). One conventional form of mechanism is shown in the drawings. This mechanism consists of the shifting ring 129 which is connected to bolts 25 to shift them into or out of engagement with gear 16 in bores 26. This ring may be moved, for example, by a lever 131 which engages in a channel 130 in the ring 129. In addition to the transmission 22, the group transmission 6 comprises a transmission 27 for forming a slow control stage N. The transmission 27 comprises a gear 29 which is non-rotatably connected to the right hand (with regard to the drawing) secondary part 28 of the double friction clutch 19. Gear 29 meshes with a gear 30 which is non-rotatably connected to the output shaft 23.

The main control group 7 comprises an output shaft 31 which is coaxially arranged with the output shaft 23 of the group transmission 6 in the non-illustrated transmission housing. The drive of said output shaft 31 is effected directly by the output shaft 23 or is effected selectively through the intervention of an input shaft or transmission 32 which is non-rotatably connected to the output shaft 23, by means of a countershaft 33. The input transmission 32 comprises a gear 34 which is non-rotatably mounted on the output shaft 23 and furthermore comprises a gear 35 which meshes with gear 34 and is non-rotatably mounted on the countershaft 33. The countershaft 33 of the main control group 7 has furthermore arranged thereon gears 36, 37 and 38 which gears are non-rotatably connected to the countershaft 33. Gear 36 meshes with a gear 39 which is freely rotatably and selectively engageably arranged on the output shaft 31. Gear 36 forms with gear 39 the velocity stage III of the main control group 7. For purposes of shifting the velocity stage III and coupling the output shaft 23 to the output shaft 31 for engaging the velocity stage IV of the main control group 7, there is provided a double control sleeve 40 which is arranged between the gears 34 and 39 and is non-rotatably but axially displaceably mounted on the output shaft 31, said double sleeve 40 being provided with synchronizing members. For purposes of forming the velocity stage II of the main control group 7, the gear 37 meshes with a gear 41 which is freely rotatably and selectively engageably mounted on the output shaft 31. The velocity stage I of the main control group 7 is formed by the gear 38 and a gear 42 meshing with gear 38. Gear 42 is freely rotatably and selectively engageably mounted on the output shaft 31. For engaging the velocity stages I and II of the main control group 7, a double control sleeve 43 with synchronizing elements is provided between the two gears 41 and 42. This sleeve 43 is through a non-illustrated control rod similar to the double control sleeve 40 operatively connected to a common control lever of the main control group.

In addition to the above mentioned power transmission elements of the output shaft 31, between the gears 39 and 41, a gear 44 is non-rotatably mounted on shaft 31, said gear 44 having a pitch circle diameter which is shorter than that of the gear 39. Gear 44 meshes with a gear 46 which is freely rotatably and selectively engageably mounted on an output shaft 45 pertaining to the control group 8. The gear 44 forms with the gear 46 an intermediate control stage Z which serves for main soil-working operations and pertains to the post control group 8 the engagement of which is effected by means of a double control sleeve 47 which is non-rotatably but axially displaceably mounted on the output shaft 45. For forming a control stage S of the group 8 for fast street operation, a gear 48 is arranged between the gears 41 and 42 and is non-rotatably mounted on the output shaft 31. Gear 48 has a pitch circle diameter which is greater than the pitch circle diameter of gear 44. Gear 48 meshes with a gear 49 which is freely rotatably and selectively engageably mounted on the output shaft 45 of control group 8. Furthermore, the output shaft 31 has its right hand end (with regard to the drawing) provided with a gear 50 which is non-rotatably mounted on shaft 31 and has a pitch circle diameter which is shorter than that of the other gears of said shaft 31. Gear 50 meshes with the gear 51 which is freely rotatably mounted on the output shaft 45. Gear 50, together with gear 51 forms a control stage L for the slow soil working operation, said control stage L pertaining to the post control group 8, the engagement of which is effected by means of a double control sleeve 52 which is arranged between the gears 49 and 51 and is non-rotatably but axially displaceably mounted on the output shaft 45. For purposes of engaging the control stage L by means of the double control sleeve 54, the gear 51 is through a hollow shaft section 53 and a gear 54 connected thereto coupled to the output shaft 45. For purposes of forming a crawl stage K of group 8, there is in addition to the gear 54 provided a gear 55 which meshes with gear 54 and pertains to the crawl transmission 56. The crawl transmission 56 comprises a gear 58 which is non-rotatably mounted on the transmission shaft 57 of transmission 56 and which meshes with a gear 59 which is freely rotatably mounted on the output shaft 45. For purposes of engaging the crawl stage K there is provided a control sleeve 60 which is non-rotatably put axially displaceably arranged on the output shaft 45 and is operatively connected to the double control sleeves 47 and 52 through non-illustrated control rods or the like. Furthermore, the control group 8 is provided with a reversing transmission 61 which latter comprises a reversing shaft 62 which is non-rotatably mounted in the non-illustrated transmission housing. Arranged on said shaft 62 there are reversing gears 64 and 65 which are interconnected through the intervention of a hollow shaft part 63. The reversing gear 64 preferably meshes with the gear 44 of the output shaft 31 of the main control group 7, whereas gear 65 meshes with a gear 66 which is freely rotatably and selectively engageably arranged on the output shaft 45. The engagement of the reversing stage R of the post control group 8 is effected by coupling the gear 62 to the output shaft through the intervention of the double control sleeve 47. Advantageously, the control rod system of the main control group 7, and the control rod system of the post control group 8 should be so designed that by means of a common control lever it is possible to shift the velocity stages I–IV of the main control group as well as the control stages K to Z and R of the post control group 8. Instead thereof, also an arrangement of the group transmission 6 in connection with the main control group 7 is applicable as it has been described for instance in the German Offenlegungsschrift 1 931 428.

Furthermore, the output shaft 44 of group 8 should advantageously be arranged coaxially with regard to the countershaft 17 of the group transmission 6. Furthermore, the output shaft 45 of group 8 should between that bearing thereof which faces the gear 17, and the control sleeve 60 be provided with a non-rotatable gear 67. Gear 67 serves for driving a stroke dependent auxiliary drive as for instance a front axle drive.

In addition thereto, the change gear transmission according to the present invention comprises an auxiliary drive which is dependent on the speed of a driving engine and which is formed by an auxiliary shaft 68 non-rotatably connected to the follower disc 4. The auxiliary shaft 68 is arranged coaxially with regard to the input shaft 5 and the output shafts 23 and 31 and through a non-illustrated intermediate transmission drives a power take-off shaft stump.

It is, of course, to be understood that the present invention is, by no means, limited to the specific showing in the drawing but also comprises any modifications within the scope of the appended claims.

What is claimed is:

1. In combination with a geared transmission in group arrangement, especially for motor driven agricultural and construction vehicles; a primary group having an input shaft adapted for connection to a source of power by a selectively operable friction clutch and an output shaft, a countershaft and a primary friction clutch member fixed on said countershaft, a pair of first gears rotatable on said countershaft, one on each side of said primary clutch member and a pair of secondary friction clutch members each connected to one of said first gears for selective cooperation with said primary friction clutch member, a pair of second gears fixed to said output shaft and each meshing with one of said first gears, so that selective engagement of one of said secondary friction clutch members with said primary friction clutch member will drive said output shaft through one of said first gears meshing with one of said second gears, another pair of meshing gears fixed to said input shaft and said countershaft, respectively, in a plane adjacent the plane of one pair of said first and second meshing gears, and coupling mechanism carried by said gear on said countershaft and the first gear in the adjacent plane comprising movable means on one of the said gears movable to engage cooperating means on the other of the said gears for driving the said first and second gears in a plane adjacent said another pair of meshing gears and said output shaft independently of said primary and secondary disengageable friction clutch members by-passed thereby, said transmission including means for connecting said output shaft to a load to be driven.

2. A geared transmission in combination according to claim 1 in which said coupling mechanism comprises bolt means axially slidable in the one of said pair of gears fixed to said first countershaft, and holes in the one of said first gears which is adjacent thereto into which said bolts can be moved.

3. A geared transmission in combination according to claim 2 in which said output shaft is coaxial with said input shaft.

4. A geared transmission in combination according to claim 3 in which said countershaft on which said primary clutch member is nonrotatably mounted and on which said secondary clutch members are rotatably mounted is parallel to and beneath said output shaft.